(12) United States Patent
Nilsson

(10) Patent No.: US 6,896,638 B2
(45) Date of Patent: May 24, 2005

(54) SYNCHRONIZING DEVICE FOR A PLANET GEAR

(75) Inventor: Dag Nilsson, Södertälje (SE)

(73) Assignee: Scania CV AB (publ) (SE)

( * ) Notice: Subject to any disclaimer, the term of this patent is extended or adjusted under 35 U.S.C. 154(b) by 0 days.

(21) Appl. No.: 10/182,685
(22) PCT Filed: Jan. 17, 2001
(86) PCT No.: PCT/SE01/00074
§ 371 (c)(1), (2), (4) Date: Oct. 3, 2002
(87) PCT Pub. No.: WO01/55620
PCT Pub. Date: Aug. 2, 2001

(65) Prior Publication Data
US 2003/0110876 A1 Jun. 19, 2003

(30) Foreign Application Priority Data
Jan. 28, 2000 (SE) .............................. 0000253

(51) Int. Cl.⁷ .............................. F16H 3/44; F16H 3/38
(52) U.S. Cl. .......................... 475/299; 475/303; 74/339
(58) Field of Search ................................ 475/298, 299, 475/303; 74/339

(56) References Cited

U.S. PATENT DOCUMENTS

| | | | | |
|---|---|---|---|---|
| 4,667,538 A | * | 5/1987 | Larsson | 475/299 |
| 4,776,228 A | * | 10/1988 | Razzacki et al. | 74/339 |
| 4,821,591 A | * | 4/1989 | Adler | 475/299 |
| 4,976,671 A | * | 12/1990 | Andersson | 475/299 |
| 5,003,834 A | * | 4/1991 | Muller et al. | 74/339 |
| 5,083,993 A | | 1/1992 | Öun | 475/299 |
| 6,022,289 A | * | 2/2000 | Francis | 475/303 |
| 6,248,038 B1 | * | 6/2001 | Nilsson et al. | 475/299 |
| 6,267,215 B1 | * | 7/2001 | Bader et al. | 74/339 |

FOREIGN PATENT DOCUMENTS

WO 9620359 7/1996

* cited by examiner

Primary Examiner—Roger Pang
(74) Attorney, Agent, or Firm—Ostrolenk, Faber, Gerb & Soffen, LLP

(57) ABSTRACT

A synchronizing arrangement in a planetary gear has an axially movable ring gear which for various gearchange positions can be coupled to either of two coupling rings, situated on their respective sides of the planetary gear, via synchronizing rings which belong to these coupling rings, are capable of limited rotation relative to the ring gear and have external locking teeth to prevent gear engagement before synchronization is achieved. The ring gear is provided with two grooves which run round its inside and each accommodates a ring-shaped locking device for transferring axial force to the respective synchronizing ring at the time of gear engagement. The respective locking device is also situated in an external groove in the relating synchronizing ring and can be compressed in the radial direction.

8 Claims, 2 Drawing Sheets

SYNCHRONIZING DEVICE FOR A PLANET GEAR

TECHNICAL FIELD

The present relates to a synchronizing arrangement for a planetary gear used in gearchange operations.

STATE OF THE ART

A known practice in heavy-duty vehicles such as trucks is for a supplementary gearbox to be connected to the vehicle's main gearbox to double the number of possible gear ratios. Such a supplementary gearbox usually incorporates a planetary gear to make it possible to change between a low gear range and a high gear range. Gear changing in the planetary gear is used in the low gear range but not in the high gear range. A known practice for facilitating changing between high and low gear ranges is to provide such planetary gears with synchronising arrangements.

From the power distribution point of view it has been found advantageous to use the ring gear of the planetary gear as a connecting sleeve which can be brought, by axial movement, into engagement with coupling rings on both sides of the planetary gear. However, achieving efficient manoeuvring of the synchronising rings which cooperate with the coupling rings and are necessary for achieving synchronisation has been found problematical when moving the ring gear in different directions in cases where the overall length of the planetary gear is short.

A solution to this problem has been indicated in Swedish patent specification SE 463 477 (and its counterparts U.S. Pat. No. 5,083,993 and EP 0 423 863). According to that solution, the ring gear is provided inside with a number of locking elements in the form of balls which are spring-loaded in the radial direction and cooperate with specially designed shoulders on the synchronising rings in order, upon axial movement of the ring gear, to cause the synchronising ring concerned to move axially towards its coupling ring. Each locking element rests in a radial recess in the ring gear, and the locking elements are held in place in pairs in the ring gear by means of a spring which extends in a circumferential direction in the ring gear and is anchored between the locking elements in the ring gear by means of an axial pin. This solution has been found to work well, but a disadvantage is that a relatively large number of locking elements are required, with consequent need for machining of the ring gear. Assembly is also difficult in that it involves many locking elements, springs and pins.

OBJECT OF THE INVENTION

The object of the invention is to provide a simplified synchronising arrangement while maintaining good function.

DESCRIPTION OF THE INVENTION

The object of the invention is achieved by means of a synchronized arrangement.

Providing the ring gear with only two ring-shaped locking devices which hold themselves in place in internal grooves in the ring gear simplifies both machining and assembly. The locking devices themselves are also of simple design. The locking devices being fitted directly in the ring gear also means that no extra space is required in the axial or radial direction. This makes possible a compact design of planetary gear.

Further features and advantages of the invention are indicated by the description and patent claims set out below.

A synchronizing arrangement in a planetary gear has an axially movable ring gear which for various gearchange positions can be coupled to either of two coupling rings, situated on their respective sides of the planetary gear, via synchronizing rings which belong to these coupling rings, are capable of limited rotation relative to the ring gear and have external locking teeth to prevent gear engagement before synchronization is achieved. The ring gear is provided with two grooves which run round its inside and each accommodates a ring-shaped locking device for transferring axial force to the respective synchronizing ring at the time of gear engagement. The respective locking device is also situated in an external groove in the relating synchronizing ring and can be compressed in the radial direction.

DESCRIPTION OF AN EMBODIMENT

Figure 1:
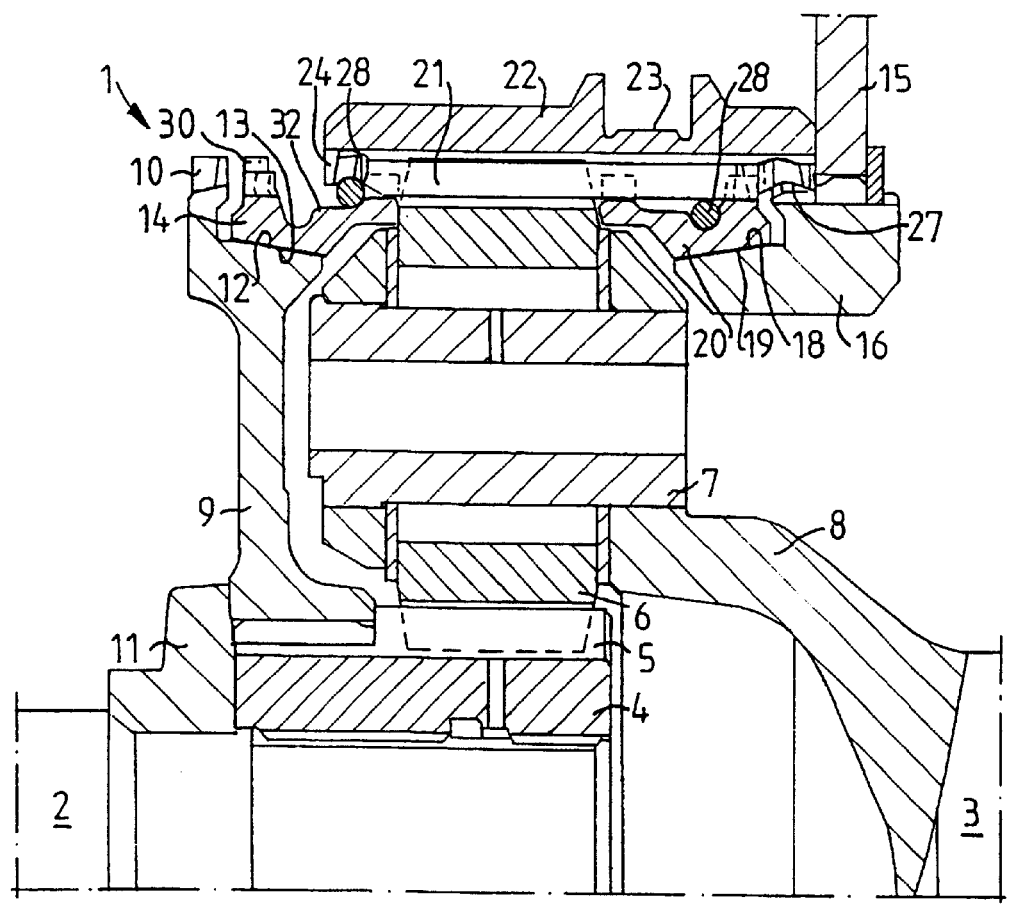
FIG. 1 depicts a longitudinal section through a planetary gear according to invention with low gear engaged.
Figure 2:
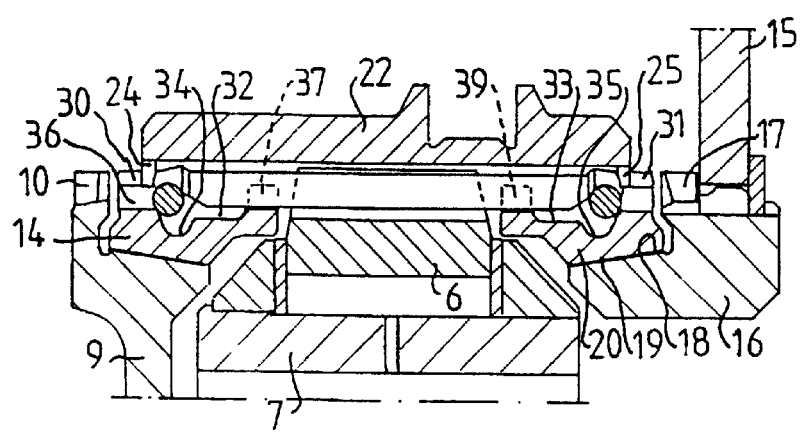
FIG. 2 depicts a longitudinal section corresponding to FIG. 1 but with neutral position engaged.
Figure 3:
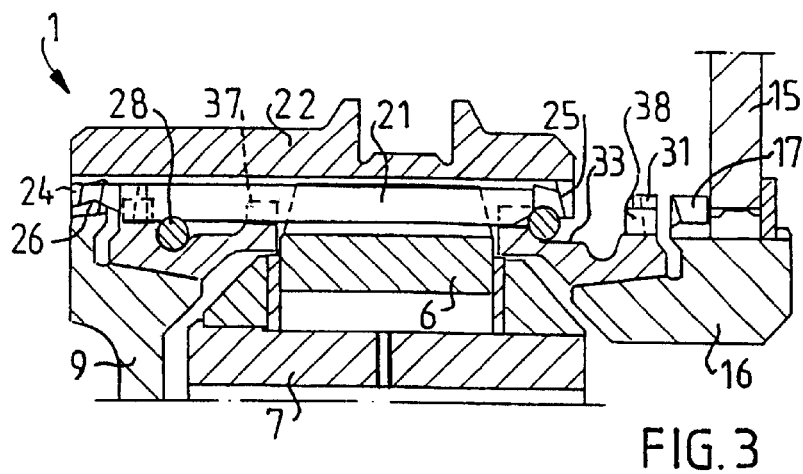
FIG. 3 depicts a longitudinal section corresponding to FIG. 1 but with high gear engaged.

A planetary gear according to invention as depicted in FIGS. 1–3 may with advantage constitute a supplementary gearbox intended to be connected to a main gearbox of a heavy-duty vehicle such as a truck or bus. For the sake of simplicity, the housing which accommodates the planetary gear 1 has been omitted.

The planetary gear 1 is arranged between an input shaft 2 from the main gearbox and an output shaft 3 from the supplementary gearbox. A sun wheel 4 is mounted on, and for joint rotation with, the input shaft 2, e.g. by means of splines, and is provided with external teeth 5 which engage with a number of surrounding planet wheels 6. These planet wheels 6 are each supported by their respective pivot pins 7 in a planet wheel carrier 8 which is integrated with the output shaft 3. The sun wheel 4 engages, in this case via teeth, and rotates jointly with a coupling ring 9 provided with external coupling teeth 10 and held in place in the axial direction on the input shaft 2 by a support ring 11. The coupling ring 9 has a conical friction surface 12 facing outwards and intended to cooperate with a corresponding conical friction surface 13 facing inwards of a synchronising ring 14.

The housing, not depicted in detail, of the planetary gear 1 includes a reaction disc 15 with a central hole in which a coupling ring 16 is fitted for joint rotation with it and is also fixed in the axial direction, e.g. by means of splines and locking devices to make it possible to remove it. On the coupling ring 16 there are external coupling teeth 17 and a conical friction surface 18, facing outwards, for cooperation with a corresponding conical friction surface 19, facing inwards, on a synchronising ring 20. The two synchronising rings 14 and 20 are of the same design but are fitted mirror-image fashion on their respective sides of the planet wheels 6.

The planet wheels 6 and the two synchronising rings 14 and 20 are surrounded by and engage with a ring gear 22 which is provided with internal teeth 21 and is fitted movably in the axial direction relative to the planet wheel and the coupling rings. This movability is accomplished by means of an undepicted coupling fork intended to engage in an external recess 23 in the ring gear 22.

Figure 5:
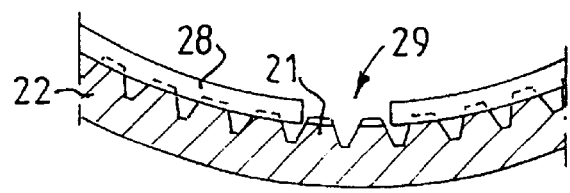
FIG. 5 depicts a radial partial section through the ring gear of the planetary gear.

The ring gear 22 is provided at its ends with internal coupling teeth 24 and 25 which are intended to cooperate with coupling teeth 10 and 17 respectively on the coupling rings 9 and 16. It is advantageous that the coupling teeth 24,25 and the teeth 21 on the ring gear 22 be integrated with one another, as in the embodiment here depicted. The ring gear 22 is provided with two grooves 26,27 running round its inside, one at each end, at the transition between the teeth 21 and the respective coupling teeth 24,25. An annular locking device 28 is clamped in each of these grooves 26,27. As indicated in more detail by FIG. 5, these locking devices 28 each take the form of an annular curved wire, advantageously with circular cross-section, which sits springingly in the groove and has a predetermined gap 29 between its opposite ends. This gap 29 allows a certain radial compression together of the locking devices 28, as will be described below.

The two synchronising rings 14 and 20 are provided with external locking teeth 30,31 which during synchronising processes do in a conventional manner lock the gearchange movement so as to achieve synchronous rotation between the ring gear 22 and the respective coupling rings 9,16. The two synchronising rings 14,20 are each provided with grooves 32,33 respectively running round their outsides and incorporating hollows 34,35 respectively. The locking devices 28 are movable in these grooves and hollows. The axial movement of the locking devices 28 relative to the synchronising rings 14,20 is limited by a number of external stop devices distributed in the circumferential direction on each synchronising ring. The synchronising rings 14,20 have axially outer stop devices 36,37 respectively and axially inner stop devices 38,39 respectively, in the form of teeth which fit in between the teeth 21.

The planetary gear 1 according to invention works as follows. During a gearchange operation, the ring gear 22 may be moved in either direction from a neutral position depicted in FIG. 2 to effect the gear change. In the neutral position, the two locking devices 28 each rest in their grooves 26,27 in the ring gear 22 and are thus situated close to the outer stop devices 36,38 on the synchronising rings 14,20. When the ring gear 22 moves to the right in FIG. 2, during engagement of low gear according to FIG. 1, the right locking device 28 will move the synchronising ring 20 to the right so that it presses against the coupling ring 16. Continuing movement of the ring gear will cause the locking device 28 to be compressed radially so that the gap 29 between its ends decreases. At the same time, the locking device 28 will be pressed down into the hollow 35, after which the coupling teeth 25 on the ring gear 22 can, when synchronisation is achieved, be inserted between the coupling teeth 17 on the coupling ring 16. At the same time, the second synchronising ring 14 is subjected only to an axial movement of the corresponding locking device 28 in the groove 32. At this stage, contact with the inner stop devices 37 will cause the left locking device 28 to keep the synchronising ring 14 out of engagement with the coupling ring 9.

Engaging high gear by moving the ring gear 22 to the left to the position depicted in FIG. 3 from the neutral position in FIG. 2 results in the corresponding process whereby the left locking device 28 forces the synchronising ring 14 to the left and is compressed radially. The compression of the locking elements 28 is facilitated by the presence of ramp-shaped transitions between the grooves 26,27 and the radially inner surface of the teeth 21.

Figure 4:
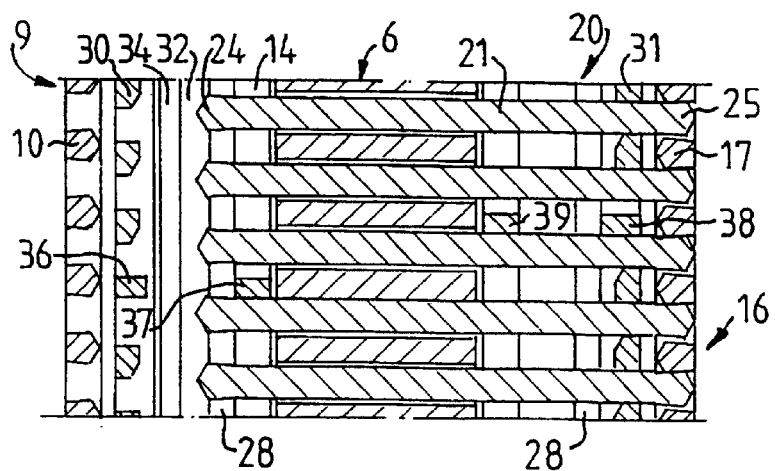
FIG. 4 depicts schematically the position of cooperating coupling teeth when low gear is engaged.

The stop devices 36–39, particularly the inner stop devices 37,39, also cause the ring gear 22 and the synchronising rings 14,20 to lock mutually in the circumferential direction, with a certain play. As indicated by FIG. 4, there is a certain mutual play in the circumferential direction because the stop devices 36,39 are narrower in the circumferential direction than the gaps between the teeth 21. This facilitates synchronisation and gear engagement.

The twisting moment to which the two synchronising rings 14,20 are subjected during a gearchange operation is in the same direction during a certain direction of rotation of the input shaft 2, e.g. during driving forwards when the input shaft 2 has a specified direction of rotation. During reversing, the direction of rotation of the input shaft 2 will be reversed, resulting in the twisting moment acting upon the synchronising rings 14,20 likewise changing direction. In the embodiment depicted, the direction of rotation of the input shaft 2 has been assumed to be unchanged and such that in FIG. 4 the coupling ring 9 and hence also the synchronising rings 14,20 and the ring gear 22 endeavour to move upwards in the drawing.

To facilitate synchronised gearchanging during both driving forwards and reversing, it is desirable that the shape of the locking teeth 30,31 on the synchronising rings be appropriate to the purpose, i.e. their shape should be such that when synchronisation is achieved the synchronising rings can rotate to a position which allows gear engagement through completed axial movement of the ring gear 22. The shape concerned may be selected as necessary and desired.

The planetary gear 1 described above is advantageous from the manufacturing and assembly point of view in that the necessary machining of component parts is simple and the number of component parts is small. The design is also such as to occupy little space in both axial and radial directions. The fact that the mutually cooperating friction surfaces can be situated at relatively great radial distances from the shafts 2,3 means that the twisting moment acting during the synchronising process as a result of friction forces may reach high values. This in turn means that the axial extent of the friction surfaces can be limited, thereby contributing to compact construction of the planetary gear.

The planetary gear described may of course also be used in other contexts than that described here. It is possible, for example, to use it with hydraulic automatic gearboxes where a multiplicity of planetary gears are coupled together.

The invention may also be used in the type of synchronising arrangements in which a multiplicity of synchronising rings are arranged on both sides of the planetary gear.

What is claimed is:

1. A synchronizing arrangement for a planetary gear, wherein the planetary gear includes first and second axially spaced apart coupling rings on a common rotation axis;

an axially moveable ring gear extending around the rotation axis and situated axially between the first and second coupling rings, the ring gear being axially moveable in opposite axial directions for selectively coupling to either the first or the second of the coupling rings for achieving various respective gear positions;

a first synchronizing ring between the ring gear and the first coupling ring and extending around the rotation axis, a second synchronizing ring between the ring gear and the second coupling ring and extending around the rotation axis, the synchronizing rings being supported with respect to the ring gear to be rotatable in a limited manner relative to the ring gear around the axis; the first and second synchronizing rings having first and second external locking teeth respectively lockable with the ring gear on axial movement toward the respective one of the first and second synchronizing rings to lock the gear ring axial movement and provide connection to the respective one of the first and second coupling rings before synchronous rotation of the ring and the respective one of the coupling rings is achieved;

respective cooperating friction surfaces between the first synchronizing ring and the first coupling ring and between the second synchronizing ring and the second coupling ring and the friction surfaces at the respective one of the first and second synchronizing rings being adapted to be pressed into friction engagement as the ring gear is moved in the direction toward the respective one of the first and second coupling rings;

a first and second locking device radially inward of the ring gear respectively toward each end of the ring gear and positioned with respect to the ring gear and the synchronizing rings for transferring axial force from the ring gear to the respective one of the first and second synchronizing rings at which the ring gear is to be coupled with the respective one of the first and second coupling rings;

a respective first and second groove around the radial inside of the ring gear and toward each axial end of the ring gear;

a respective third and fourth groove in the radial outside of the first and second synchronizing rings, respectively; each of the third and fourth grooves in the first and second synchronizing rings respectively has a respective one of a first and second hollow extending around the synchronizing ring and located toward the axial side of the grooves nearest to the respective coupling ring, the hollows being and positioned and shaped for receiving the respective one of the first and second locking devices therein and also being shaped for the locking devices to be compressed in the hollows by the ring gear being disposed to apply radial force to the respective locking device, and the ring gear being shaped for applying such radial force as the ring gear is being moved toward the respective one of the first and second coupling rings where the locking device is in the respective hollow;

each locking device comprising a substantially annular locking device which is capable of being compressed in the radial direction, the first locking devices being in each of the first and third grooves and the second locking device being in the second and fourth grooves, enabling the locking device to move axially as the ring gear moves axially.

2. The synchronizing arrangement of claim 1, further comprising radially outwardly protruding stops adjacent to and on opposite axial sides of the third and fourth grooves in the synchronizing rings for limiting the mutual axial movement between the locking device and the ring gear.

3. The synchronizing arrangement of claim 1, further comprising radially outwardly protruding stops adjacent to and on opposite axial sides of the external third and fourth grooves in the synchronizing rings for limiting the mutual axial movement between the locking device and the ring gear.

4. The synchronizing arrangement of claim 3, wherein the ring gear has teeth directed radially inwardly and at least the stop devices which are axially more inward and toward each other are shaped and positioned to fit between the teeth of the ring gear to lock the ring gear and the synchronizing rings mutually in the circumferential rotation direction.

5. The synchronizing arrangement of claim 4, wherein the locking device is so shaped and the teeth of the ring gear are so shaped that each locking device is compressed in the radial direction by the teeth on the ring gear when the ring gear is moved axially toward the respective one of the locking devices, as the ring gear moves axially to bring the respective synchronizing ring into engagement with the respective coupling ring.

6. The synchronizing arrangement of claim 5, wherein each of the third and fourth grooves in the first and second synchronizing rings respectively has a respective one of a first and second hollow extending around the synchronizing ring and located toward the axial side of the grooves nearest to the respective coupling ring, the hollows being positioned and shaped for receiving the respective one of the first and second locking devices therein and also being shaped for the locking devices to be compressed in the hollows by the ring gear being disposed to apply radial force to the respective locking device, and the ring gear being shaped for applying such radial force as the ring gear is being moved toward the respective one of the first and second coupling rings where the locking device is in the respective hollow.

7. The synchronizing arrangement of claim 6, wherein the bottom of the hollow has a depth selected with respect to the teeth of the ring gear and the locking device has a thickness such that the thickness between the teeth of the ring gear and the bottom of the hollow in each of the grooves of the synchronizing rings is at least equal to the thickness of the locking device.

8. A synchronizing arrangement for a planetary gear, wherein the planetary gear includes first and second axially spaced apart coupling rings on a common rotation axis;

an axially moveable ring gear extending around the rotation axis and situated axially between the first and second coupling rings, the ring gear being axially moveable in opposite axial directions for selectively coupling to either the first or the second of the coupling rings for achieving various respective gear positions;

a first synchronizing ring between the ring gear and the first coupling ring and extending around the rotation axis, a second synchronizing ring between the ring gear and the second coupling ring and extending around the rotation axis, the synchronizing rings being supported with respect to the ring gear to be rotatable in a limited manner relative to the ring gear around the axis; the first and second synchronizing rings having first and second external locking teeth respectively lockable with the ring gear on axial movement toward the respective one of the first and second synchronizing rings to lock the gear ring axial movement and provide connection to the respective one of the first and second coupling rings before synchronous rotation of the ring and the respective one of the coupling rings is achieved;

respective cooperating friction surfaces between the first synchronizing ring and the first coupling ring and between the second synchronizing ring and the second coupling ring and the friction surfaces at the respective one of the first and second synchronizing rings being adapted to be pressed into friction engagement as the ring gear is moved in the direction toward the respective one of the first and second coupling rings;

a first and second locking device radially inward of the ring gear respectively toward each end of the ring gear and positioned with respect to the ring gear and the synchronizing rings for transferring axial force from the ring gear to the respective one of the first and second synchronizing rings at which the ring gear is to be coupled with the respective one of the first and second coupling rings;

a respective first and second groove around the radial inside of the ring gear and toward each axial end of the ring gear;

a respective third and fourth groove in the radial outside of the first and second synchronizing rings, respectively;

each locking device comprising a substantially annular locking device which is capable of being compressed in the radial direction, the first locking devices being in each of the first and third grooves and the second locking device being in the second and fourth grooves, enabling the locking device to move axially as the ring gear moves axially;

each of the locking devices comprises a resilient ring which is open with free ends and the resilient rings being shaped so that there is a gap between the free ends of the resilient rings, wherein the respective locking devices are fitted and positioned in the first and second grooves of the ring gear, each of the locking devices being arranged so that when resting in the respective one of the first and second grooves in the ring gear, the locking device is resiliently fixed in the groove.

* * * * *